United States Patent [19]

Lockerby et al.

[11] Patent Number: 4,503,586
[45] Date of Patent: Mar. 12, 1985

[54] APPARATUS AND METHOD FOR PROCESSING CRABS

[76] Inventors: W. Lee Lockerby, 111 Hudlow Rd., Forest City, N.C. 28043; Alfred R. Guglielmo, 650 N. Ardenwood - Bldg. #5, Baton Rouge, La. 70806

[21] Appl. No.: 459,991

[22] Filed: Jan. 21, 1983

[51] Int. Cl.³ .............................................. A22C 29/02
[52] U.S. Cl. ........................................... 17/48; 17/71
[58] Field of Search .................. 17/71, 48, 46, 45, 58; 83/425.1, 425.3, 435.2; 409/236

[56] References Cited

U.S. PATENT DOCUMENTS

| | | | |
|---|---|---|---|
| 2,109,365 | 2/1938 | Carll et al. | 83/425.4 X |
| 2,502,091 | 3/1950 | Harris et al. | 17/71 |
| 3,156,946 | 11/1964 | Moncure | 17/71 |
| 3,253,299 | 5/1966 | Harris | 17/45 |
| 3,302,236 | 2/1967 | Harris | 17/71 |
| 3,495,293 | 2/1970 | Tolley | 17/71 |
| 3,495,294 | 2/1970 | Reinke | 17/54 |
| 3,596,310 | 8/1971 | Tolley | 17/71 |
| 3,597,792 | 8/1971 | Lockerby | 17/71 |
| 3,611,478 | 10/1971 | Lockerby | 17/71 |
| 3,899,955 | 8/1975 | Selch et al. | 409/236 X |
| 4,041,822 | 8/1977 | Gabel | 83/425.3 X |
| 4,073,041 | 2/1978 | Davis et al. | 17/71 |
| 4,293,981 | 10/1981 | Smith | 17/71 |
| 4,380,094 | 4/1983 | Tolley et al. | 17/71 |

FOREIGN PATENT DOCUMENTS 90421 11/1957 Norway .............................. 17/58

OTHER PUBLICATIONS

Key Equipment Company, brochure, 4 pages.

*Primary Examiner*—Willie G. Abercrombie
*Attorney, Agent, or Firm*—Bell, Seltzer, Park & Gibson

[57] ABSTRACT

An apparatus and method for processing hard shell crabs is disclosed, and which includes means for initially engaging and aligning the crab bodies with the path of travel through the apparatus, and then clampingly pressing the bodies against a supporting surface to maintain the orientation of the bodies during their movement through the subsequent processing operations. Trimming saws are mounted along the path of travel for severing the claws and legs, cleaning brushes are provided for removing the gills and other inedible materials, and a slicer is provided for cutting the trimmed and cleaned bodies into half sections while removing the central partition of the bodies.

19 Claims, 9 Drawing Figures

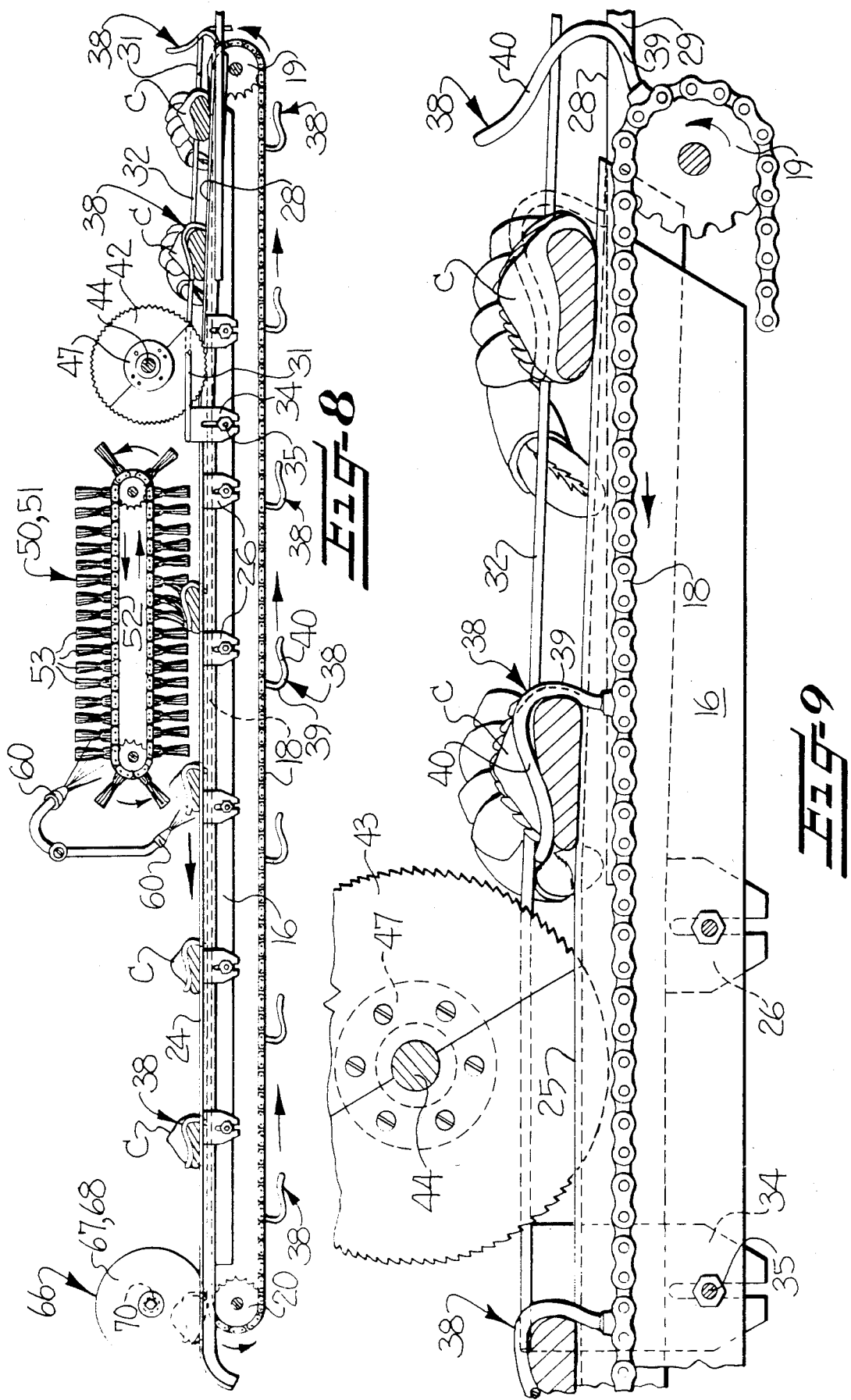

APPARATUS AND METHOD FOR PROCESSING CRABS

The present invention relates to an apparatus and method for processing hard shell crabs to facilitate meat removal. More particularly, the present invention relates to a commercially efficient apparatus and method for trimming, cleaning, and sectioning crab bodies so that the meat therein may be easily removed.

Until very recently, the crab industry was almost entirely dependent upon manual operations for the extraction of the meat from the crab bodies. During the late 1960's however, the present applicant developed a partially automated system which included the mechanical extraction of the meat from crabs. Under that prior system, the crabs were initially cooked, and then the back shells were removed, the bodies cleaned, and the claws and arms removed, all by manual operations. The cleaned bodies were then placed in a body slicing apparatus, which sliced the bodies in half while simultaneously removing the central longitudinal partition of the crabs so as to expose the meat containing compartments. Next, the body halves were placed in a centrifugal extractor, which acted to expel the meat from the body halves. The above described slicing apparatus is further disclosed in applicant's prior U.S. Pat. No. 3,611,478, and the centrifugal extractor is further described in applicant's prior U.S. Pat. No. 3,597,792.

While the applicant's above described system has represented a substantial advance in the art, and has been successfully employed in commercial operations, it still involved a significant amount of manual labor in the initial preparation of the crab bodies, particularly with respect to the cleaning of the crab bodies and the removal of the claws and legs. There have been several prior attempts by others to automate this aspect of the process, note for example U.S. Pat. Nos. 3,495,293 and 2,502,091. However, it is beleived that these prior proposals have not been commercially successful, primarily by reason of difficulties in maintaining the orientation and alignment of the crab bodies during the various processing operations.

It is accordingly an object of the present invention to provide an apparatus and method for the processing of crabs, which effectively mechanizes substantially all of the processing operations and is thus suitable for commercial operations.

It is a more particular object of the present invention to provide a fully automated apparatus and method for the processing of crabs and which includes the operations of removing the claws and arms, and cleaning and slicing the bodies, all in one continuous uninterrupted operation.

It is still another object of the present invention to provide an apparatus and method for the processing of crab bodies which provides for the self alignment of the crab bodies, and the effective retention of the crab bodies so as to maintain the desired orientation and alignment through all of the processing operations.

It is a further object of the present invention to provide an apparatus and method of the described type, and which is adjustable to accomodate differently sized crab species, such as the relatively small Blue crabs indigenous to the East coast or the relatively large Dungeness crabs found on the West coast.

These and other objects and advantages of the present invention are achieved in the embodiment illustrated herein by the provision of an apparatus and method which includes crab advancing means for advancing the crab bodies serially along a path of travel. The advancing means is composed of an endless conveyor having an upper run disposed along the path of travel, and a plurality of retainers mounted in spaced relation along the conveyor. Each retainer includes a forwardly directed arm which is adapted for physically engaging a crab which has had its back shell removed along a line extending longitudinally through the central body cavity of the crab and parallel to the direction of movement. Also, the retainer acts to clampingly press the crab along such line against a supporting surface to thereby maintain the orientation of the crab body during its advancing movement.

A pair of rotary driven, laterally spaced apart circular trimming saws are disposed along the path of travel for severing the claws and legs of the advancing crab bodies, and cleaning means in the form of a pair of laterally spaced apart brush assemblies is provided along the path of travel for removing the gills and other inedible material from the advancing crab bodies. Also, a slicer is disposed downstream of the trimming and cleaning means for cutting the crab bodies longitudinally into two half sections.

As a further aspect of the preferred embodiment of the invention, there is provided a pair of guide rods disposed along the path of travel immediately upstream of and through the claw and leg trimming saws, with the guide rods being laterally spaced apart so as to be adapted to engage and spread the claws and legs of the advancing crabs as they move into and through the trimming saws. Also, the various components of the apparatus are adjustably mounted to the supporting frame, to permit the apparatus to accommodate differently sized crab species.

Some of the objects having been stated, other objects and advantages of the invention will appear as the description proceeds, when taken in connection with the accompanying drawings, in which:

FIG. 8 is a fragmentary side elevation view illustrating the conveyor means of the apparatus; and FIG. 9 is an enlarged longitudinal section view of the upstream end of the conveyor means and trimming saws.

Figure 1:
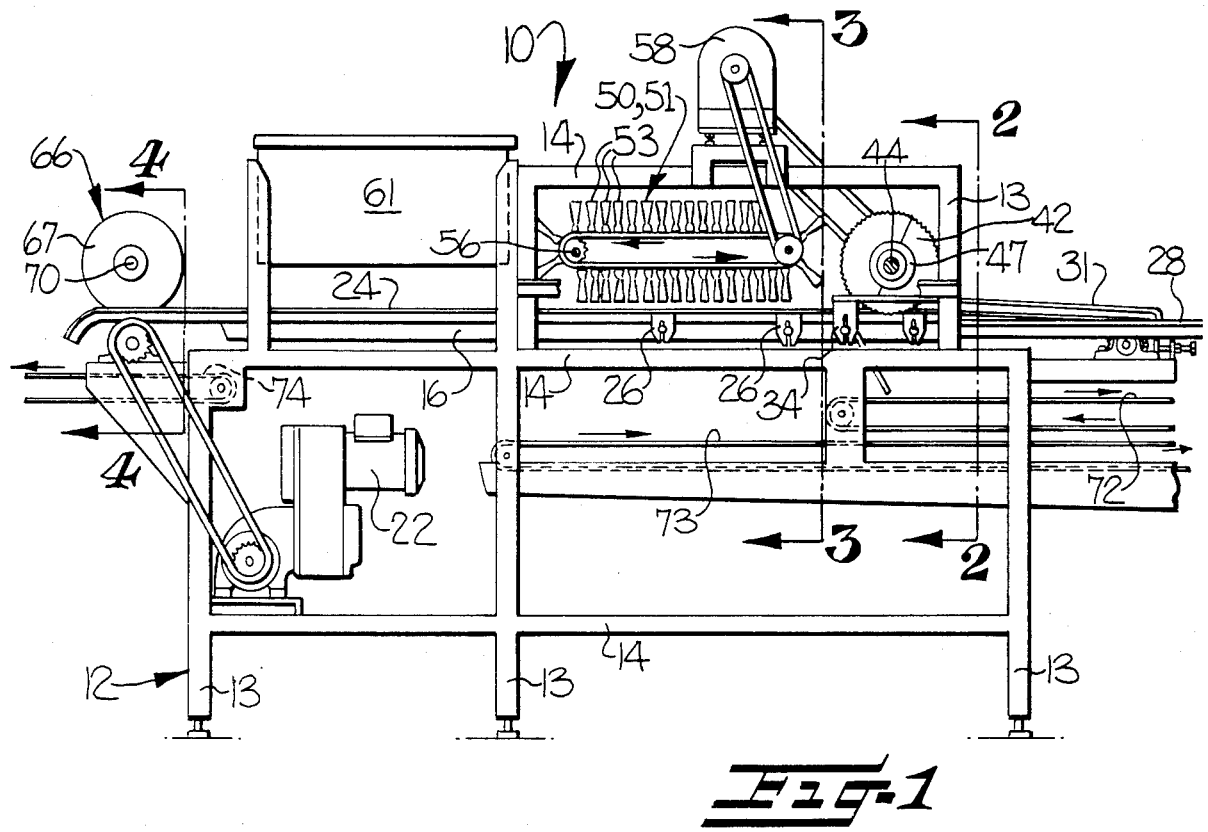
FIG. 1 is a side elevation view of an apparatus which embodies the features of the present invention.
Figure 2:
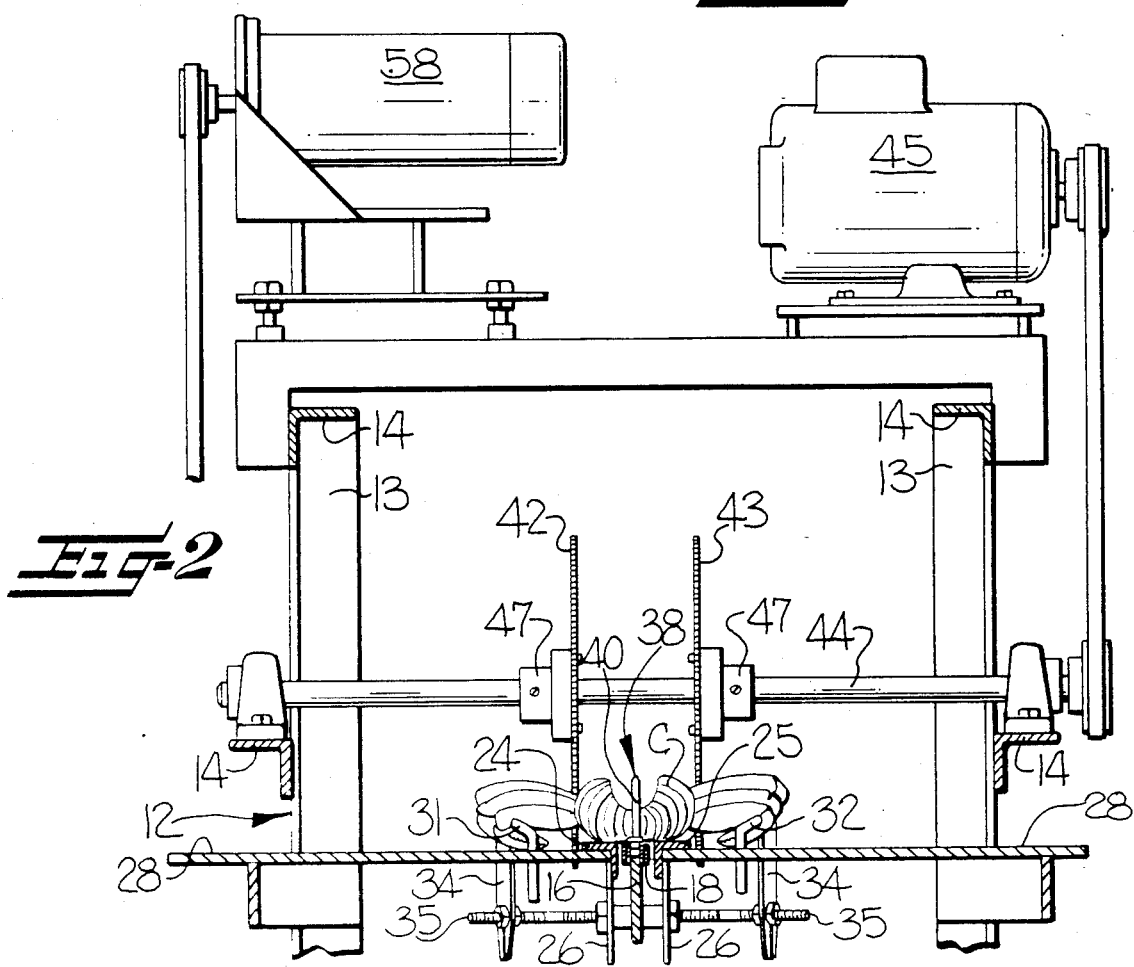
FIG. 2 is a sectional end view of the apparatus taken substantially along the Line 2—2 of FIG. 1.
Figure 3:
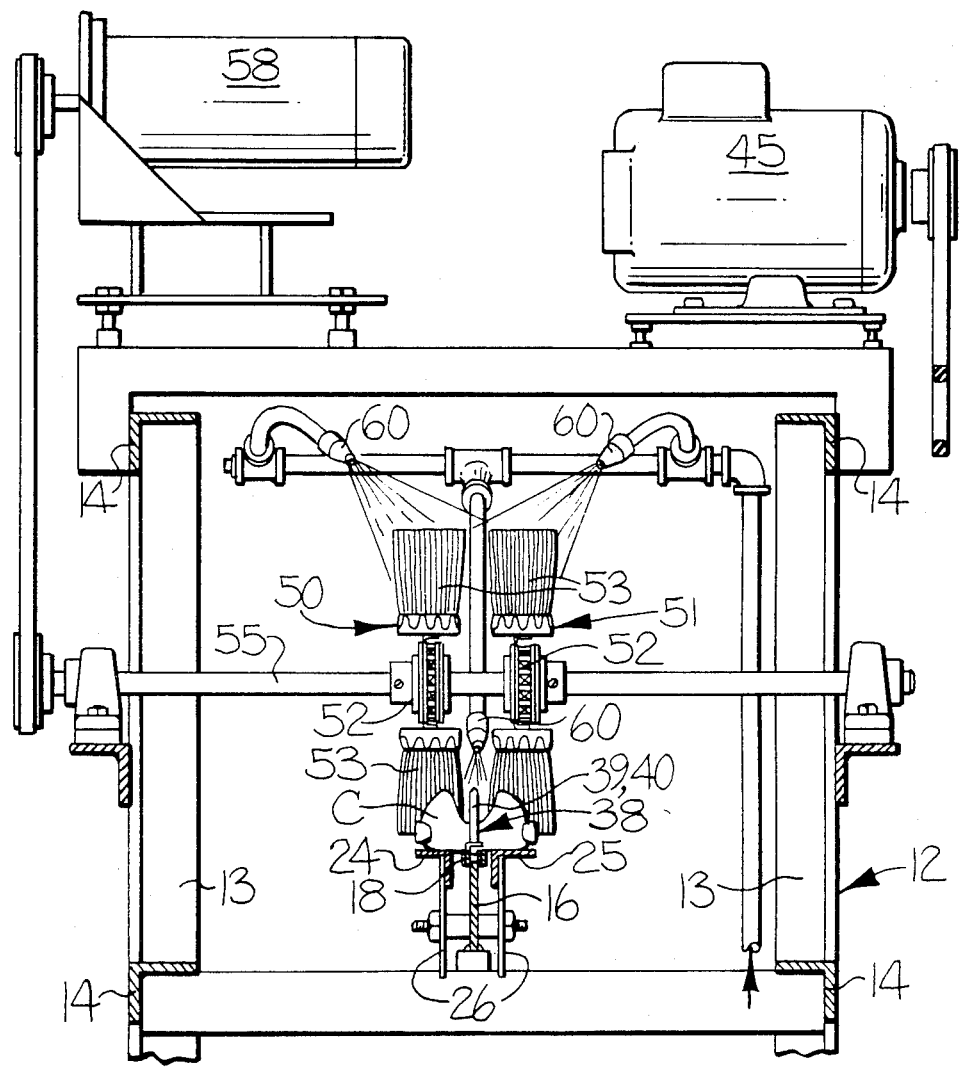
FIG. 3 is a sectional end view of the apparatus taken substantially along the Line 3—3 of FIG. 1.
Figure 4:
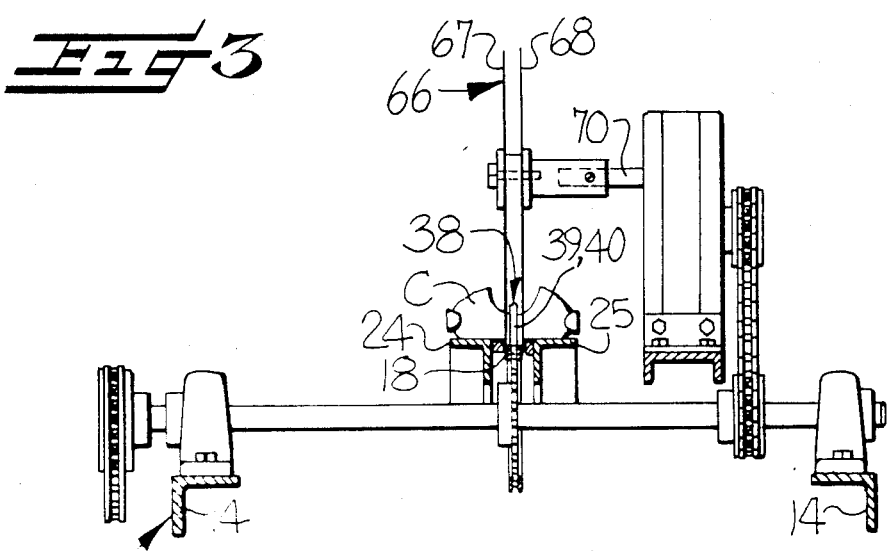
FIG. 4 is a sectional end view of the apparatus and taken substantially along the Line 4—4 of FIG. 1.

Referring more particularly to the drawings, the illustrated embodiment of the invention comprises an apparatus 10 which includes a generally box like frame 12 which is composed of a number of interconnected uprights 13 and horizontal members 14. A central support bar 16 is fixed to the frame, and extends horizontally along a substantial portion of the longitudinal length of the apparatus, with the support bar defining a path of travel for the crab bodies C which are advanced through the apparatus as hereinafter further described.

The frame 12 also mounts conveyor means for serially advancing the crab bodies C along the path of travel and which includes an endless conveyor in the form of a chain 18 which is operatively disposed about the sprockets 19, 20, note FIG. 8. A variable speed electric motor 22 is mounted on the frame and is operatively connected to the sprocket 20 for advancing the conveyor chain at a controlled speed. The sprockets are rotatably mounted so that the upper run of the conveyor chain slides along and is supported by the upper edge of the support bar 16.

A pair of parallel, laterally spaced apart support rails 24, 25 are adjustably secured to the bar 16, and so that the upper edge of the bar and the chain 18 extend between the rails. More particularly, the rails 24, 25 are adjustably secured to the bar by means of the slotted brackets 26, so that the elevation of the rails may be adjusted with respect to the bar at several points along the longitudinal length of the apparatus.

Figure 5:
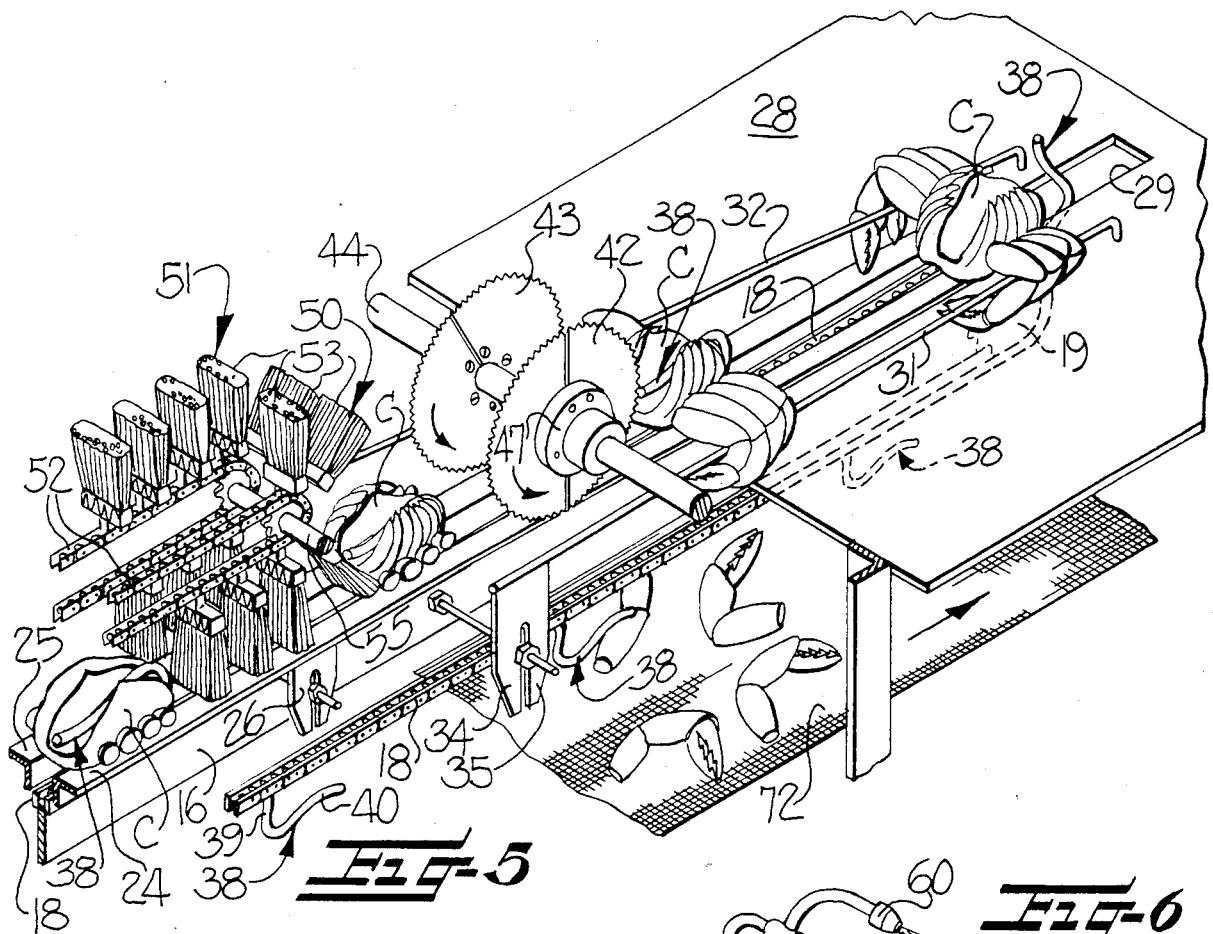
FIG. 5 is a perspective view of the upstream end portion of the apparatus, and illustrating the trimming saws and the cleaning brushes.
Figure 7:
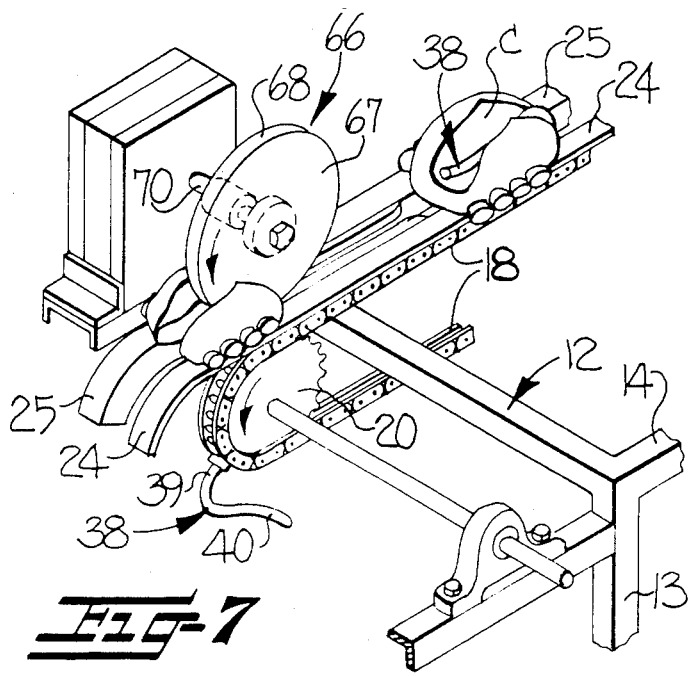
FIG. 7 is a fragmentary perspective view of the body slicer at the downstream end of the apparatus.

As best seen in FIG. 5, the upstream end of the frame mounts a horizontal table 28, which includes a slot 29 for receiving the upstream ends of the rails 24, 25 and the conveyor chain 18. Also, a pair of guide rods 31, 32 are disposed along the upstream end portion of the rails, with the upstream ends of the rods being fixed to the table 28 on opposite sides of the slot 29 and the downstream ends of the rods being adjustably fixed to the bar by means of a slotted bracket 34 and threaded member 35. By this arrangement, the elevation of the rods 31, 32 may be adjusted with respect to the bar 16, and the lateral separation of the downstream ends of the rods may also be adjusted.

The crab advancing means of the illustrated apparatus 10 further includes a plurality of retainers 38 mounted in equally spaced relation along the length of the chain 18. Each retainer 38 includes an upright arm 39 having one end fixed to a link of the chain 18, and an integral, elongate forwardly directed arm 40 which is generally parallel to and spaced from the chain.

Claw and leg trimming means is disposed along the path of travel, and comprises a pair of rotary driven, laterally spaced apart circular saws 42, 43. The saws 42, 43 are fixedly mounted on a common shaft 44 which extends transversely across the path of travel, and the shaft and saws are rotated by an electric motor 45 which is mounted on the frame 12. Also, the saws 42, 43 each comprise a pair of semi-circular blade segments which are releaseably attached to the hubs 47, so that the saws may be disassembled for repair or replacement without removing the shaft 44. The hubs 47 are preferably releaseably secured to the shaft 44, so as to permit the lateral separation of the saws to be varied so as to accomodate differently sized crab species.

Immediately downstream of the saws 42, 43 there is provided a pair of laterally spaced apart brush assemblies 50, 51 for removing the gills or other inedible materials from the crab bodies. In the illustrated embodiment, the brush assemblies 50, 51 are disposed on respective opposite sides of the path of travel, and so that each brush assembly is adapted to engage one side of the advancing crabs. In addition, each brush assembly comprises an endless belt 52 mounted to define upper and lower runs, and a plurality of brushes 53 are mounted on each of the belts so as to extend downwardly therefrom on the lower run and toward the rails 24, 25. The belts 52 are mounted between sprockets fixed to the shafts 55, 56, and an electric motor 58 is connected to the front drive shaft 55 for advancing the assemblies in unison, with the lower run moving in a direction opposite to the direction of movement of the upper run of the chain 18.

The speed of the motor 58 is preferably adjustable so that the speed of the belts 52 can be varied for the particular crab species being processed. In this regard, the speed of the belts 52 will be correlated with the stiffness of the brushes 53 and the speed of the conveyor chain 18 so as to provide optimum removal of the gills with minimal damage to the crab bodies. The fact that the lower runs of the belts 52 move across the crab bodies in a linear direction, as opposed to purely rotary movement, is also significant, since such linear movement provides effective gill removal at a slower relative speed to thereby further minimize damage to the bodies.

Figure 6:
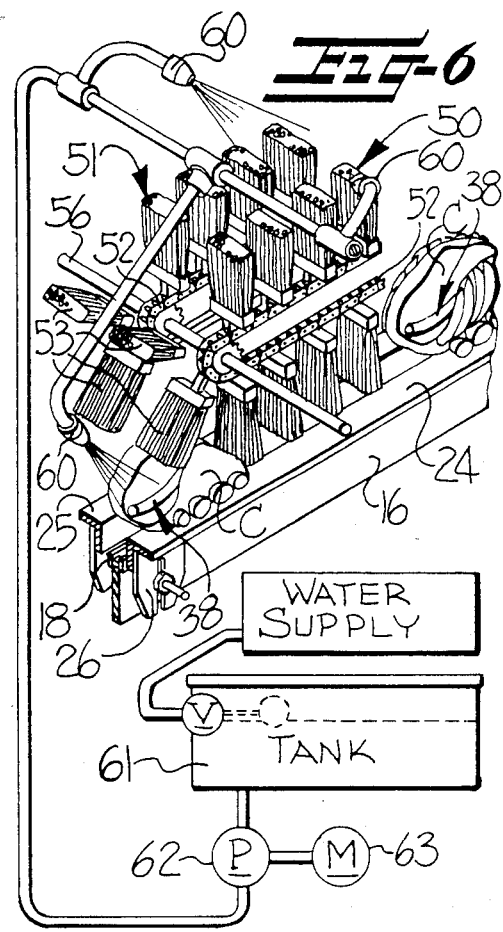
FIG. 6 is a partly schematic fragmentary perspective view of a portion of the cleaning brushes of the apparatus.

The crab cleaning means further includes a number of water jets 60 for directing a jet of water onto each brush assembly to clean the brushes and thereby facilitate the removal of the inedible materials from the advancing crabs. As best seen in FIG. 6, a water jet may also be positioned to direct the water directly onto the advancing crabs, and if desired, further jets (not shown) may be provided for directing water onto the trimming saws 42, 43 for cleaning purposes. The water is supplied to the jets from a tank 61 mounted on the apparatus, wherein a suitable bacteriocide may be added. A pump 62 which is driven by the motor 63 may then be provided on the frame 12 for conveying the treated water to the nozzles of the water jets 60.

The apparatus 10 further includes a slicer 66 disposed along the path of travel downstream of the cleaning means for cutting the crab bodies C longitudinally into two half sections. The slicer 66 includes a pair of rotary driven, closely spaced apart circular saws 67, 68, which are mounted on the shaft 70 immediately above the chain 18. The separation of the saws 67, 68 is designed so that the arms 40 of the retainers pass therebetween, and such that the saws cut through the center portions of the crabs on opposite sides of the central body partition thereof.

The method of operating the above described apparatus will now be described. As best seen in Figures the crab bodies C are normally delivered to the apparatus 10 after having been cooked and the back shells removed by hand or other conventional means. The crab bodies C are then serially placed on the table at the upstream end of the rods 31, 32 by the machine operator, and the claws and legs are spread and draped over and around the rods. As the chain 18 advances, a retainer 38 will move around the sprocket 19 so that the forwardly directed arm 40 closes onto each crab body along a line extending longitudinally through the central visceral cavity of the body. This movement of the arm into the central cavity tends to automatically align the axis of the crab body with the longitudinal direction of the bar and thus the path of travel. In this regard, it will be noted that the retainer does not initially clampingly engage the crab body, and thus the body is free to shift and self align itself with the longitudinal direction of the apparatus. The retainer then advances the body toward the trimming saws 42, 43, with the rods 31, 32 engaging and spreading the claws and legs.

As best seen in FIG. 9, the rails 24, 25 are preferably suitably adjusted in elevation so that the rails are slightly inclined with respect to the chain 18 and retainers 38 and such that each retainer clampingly presses the crab body downwardly into firm contact with the rails as the body approaches the trimming saws. Thus as the body advances through the saws, it is firmly held by the retainer in the desired orientation, so that the claws and legs are severed along a line closely adjacent the sides of the body. The severed claws and legs then drop onto the conveyor 72 for removal and subsequent processing as may be desired.

The crab body C next advances through the cleaning brush assemblies 50, 51, with each brush assembly sweeping along one side of the body in a direction opposite its direction of advance. The brushes serve to remove the gills and other undesired materials, and the removed materials drop onto another conveyor 73 for suitable disposal.

The crab body, which remains clampingly pressed between the retainer 38 and rails 24, 25 is next advanced through the slicer 66, where the body is cut into two half sections. More particularly, the two closely spaced saws 67, 68 of the slicer are designed to closely receive the arm 40 of the retainer therebetween, and such that the saws cut longitudinally through the center portion of the crab body on opposite sides of the central body partition thereof, and so as to remove the partition and thereby expose the meat containing compartments. The resulting halves drop onto another conveyor 74 for transport to a centrifugal extractor as described in the above noted prior U.S. Pat. No. 3,597,792, or the like.

As will be apparent from the above description, the various components of the apparatus 10 are adjustable to accommodate different crab species, which vary considerably in size. In particular, the lateral separation of the trimming saws 42, 43 and the lateral separation of the rods 31, 32 are each adjustable. Also, the elevation of the rails 24, 25 is adjustable with respect to the chain and retainers at several points along the length of the apparatus to permit adjustment of the clamping pressure between the retainer and rails. Still further, the various running components of the apparatus are individually driven, to permit separate adjustment of their speed of operation for maximum effectiveness.

In the drawings and specification there has been set forth a preferred embodiment of the invention, and although specific terms are employed, they are used in a generic and descriptive sense only and not for purposes of limitation.

That which is claimed is:

1. An apparatus for processing crab bodies which have had their back shells removed, and comprising
   crab advancing means for advancing crab bodies serially along a path of travel and including support means extending along the path of travel, conveyor means disposed along the path of travel and adjacent said support means, means for moving the conveyor means along the path of travel, and a plurality of retainers mounted in spaced relation to said conveyor means, with each retainer including forwardly directed arm means adapted for physically engaging a crab body along a line extending parallel to the direction of movement and longitudinally through the central cavity of the crab body, and for clampingly pressing the crab body along such line against said support means to maintain the orientation of the crab body during such advancing movement,
   trimming means disposed along the path of travel for severing the claws and legs of the advancing crab bodies,
   cleaning means disposed along the path of travel for removing the gills and other inedible materials from the advancing crab bodies, and
   slicer means disposed along the path of travel downstream of said trimming and said cleaning means for cutting the crab bodies longitudinally into two half sections.

2. The apparatus as defined in claim 1 wherein said conveyor means comprises an endless conveyor having an upper run disposed along the path of travel.

3. The apparatus as defined in claim 2 further comprising a frame including a support bar extending along the path of travel, with the upper edge of said bar slideably supporting said upper run of said conveyor, and wherein said support means comprises a pair of parallel, laterally separated support rails fixed to said frame with the rails being disposed on opposite sides of the bar and with said upper run of said conveyor disposed therebetween.

4. The apparatus as defined in claim 3 including means for adjusting the elevation of said rails with respect to the upper run of said conveyor, whereby the conveyor may be adjusted so that each retainer initially loosely engages the central cavity of the body to permit the self alignment of the crab body with the longitudinal direction of the path of travel, and subsequently firmly holds the crab body against the rails during the processing operations, and the advancing means may be adjusted to accommodate differently sized crab species.

5. The apparatus as defined in claim 4 wherein said apparatus further comprises a pair of guide rods disposed along the path of travel immediately upstream of and adjacent said trimming means, with said guide rods being laterally spaced apart on opposite sides of said conveyor and so as to be adapted to engage and spread the claws and legs of the advancing crabs.

6. The apparatus as defined in claim 5 further comprising means for adjustably mounting said guide rods to said frame to permit the lateral separation of the portions thereof adjacent said trimming means to be varied and so as to permit accommodation of differently sized crab species.

7. The apparatus as defined in claim 6 wherein said trimming means comprises a pair of rotary driven, laterally spaced apart circular saws, with said saws being fixedly mounted on a common shaft which extends transversely across the path of travel.

8. The apparatus as defined in claim 7 wherein each of said circular saws comprises a pair of semicircular blade segments, and means for releaseably attaching the segments to said shaft so that the saws may be removed for replacement or cleaning without dismantling the shaft.

9. The apparatus as defined in claim 7 wherein said cleaning means comprises a pair of laterally spaced apart brush assemblies, with said brush assemblies being disposed on respective opposite sides of the center line of the path of travel so that each brush assembly is adapted to engage one side of the advancing crabs.

10. The apparatus as defined in claim 9 wherein each of said brush assemblies comprises an endless belt mounted to define upper and lower generally linear runs which are disposed parallel to and above the path of travel, and a plurality of brushes mounted on each of said belts so as to extend downwardly therefrom on said lower run, and drive means for advancing the assemblies in unison with the lower runs moving in a direction opposite to that of the advancing crabs.

11. The apparatus as defined in claim 10 wherein said cleaning means further includes water jet means for directing a jet of water onto each brush assembly to clean the brushes and facilitate the removal of the inedible materials from the advancing crabs.

12. The apparatus as defined in claim 7 wherein said slicer means includes a pair of rotary driven, closely spaced apart circular saws mounted so that said retainers pass between the saws, and such that the saws are adapted to cut through the center portions of the crabs on opposite sides of the central body partition thereof and so as to remove such partition.

13. An apparatus for processing crab bodies which have had their back shells removed, and comprising crab advancing means for advancing crab bodies serially along a path of travel and including support means extending along the path of travel, conveyor means disposed along the path of travel and adjacent said support means, means for moving the conveyor means along the path of travel, and a plurality of retainers mounted in spaced relation to said conveyor means, with each retainer including forwardly directed arm means adapted for physically engaging a crab body along a line extending parallel to the direction of movement and longitudinally through the central cavity of the crab body, and for clampingly pressing the crab body along such line against said support means to maintain the orientation of the crab body during such advancing movement.

14. The apparatus as defined in claim 13 further comprising slicer means disposed along the path of travel for cutting the crab bodies longitudinally into two half sections, said slicer means including a pair of rotary driven, closely spaced apart circular saws mounted so that said retainers pass between the saws, and such that the saws are adapted to cut through the center portions of the crabs on opposite sides of the central body partition thereof and so as to remove such partition.

15. A method of processing crabs to facilitate the removal of the meat, and comprising the steps of removing the back shell from each crab, serially advancing each resulting crab body along a predetermined path of travel, with the longitudinal centerline of each crab body being aligned with the direction of movement, and while physically engaging each crab body along a line extending longitudinally through the central cavity of the body and clampingly pressing the crab body along such line against a supporting surface to maintain the orientation of the crab body during the advancing movement, trimming the claws and legs of the advancing crab bodies, cleaning the advancing crab bodies to remove the gills and other inedible material therefrom, and then slicing the advancing crab bodies longitudinally into two half sections.

16. The method as defined in claim 15 comprising the further step of engaging and spreading the claws and legs of the advancing crab bodies immediately prior to and during the trimming step.

17. The method as defined in claim 16 wherein the cleaning step includes engaging the advancing crab bodies with a moving brush assembly, while directing a jet of water onto the brush assembly to facilitate cleaning of the brush assembly.

18. The method as defined in claim 16 wherein the slicing step includes cutting longitudinally through the center portion of the crab bodies on opposite sides of the central body partition thereof and so as to remove such partition and open the half sections to their meat containing compartments.

19. The method as defined in claim 15 wherein the advancing step includes initially loosely engaging each crab body along a line extending longitudinally through the central cavity to permit the self alignment of the body with the longitudinal direction, and thereafter clampingly pressing the crab body against the supporting surface.

* * * * *